United States Patent Office 3,755,442
Patented Aug. 28, 1973

3,755,442
ACENAPHTHYL AMIDES AND AMINES
Seymour D. Levine, North Brunswick, N.J., assignor to
E. R. Squibb & Sons, Inc., Princeton, N.J.
No Drawing. Continuation-in-part of application Ser. No.
862,951, Oct. 1, 1969. This application Mar. 15, 1972,
Ser. No. 234,986
Int. Cl. C07c 103/34
U.S. Cl. 260—558 P  10 Claims

ABSTRACT OF THE DISCLOSURE

Acenaphthenones are reduced to the corresponding acenaphthenols and the latter converted to the corresponding amides by reaction with a nitrile in the presence of an acid. The amides may then be reduced to the corresponding amines. The amides and amines possess anti-inflammatory activity.

RELATED APPLICATION

This application is a continuation-in-part of copending application Ser. No. 862,951 filed Oct. 1, 1969 now abandoned.

The present invention relates to acenaphthyl amides and amines.

It is an object of the present invention to provide new acenaphthyl amides and amines having anti-inflammatory activity. Another object is to provide intermediates for the preparation of these new compounds. A further object is to provide a method for obtaining these compounds. These and other objects of the present invention will be apparent from the following description.

SUMMARY OF THE INVENTION

It has now been found that acenaphthyl amides and amines possess anti-inflammatory activity. They may be administered orally in accepted pharmaceutical dosage forms. The compounds may be prepared starting from an acenaphthenone, by reducing the latter to the corresponding acenaphthenol, and then converting the latter to the corresponding amide by reaction with a nitrile in the presence of an acid.

DETAILED DESCRIPTION

The present invention relates to acenaphthyl amides and amines having the structure

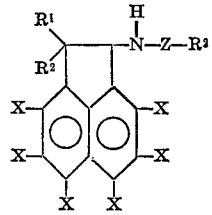

(I)

In the compounds of Formula I, $R^1$ and $R^2$ may each be hydrogen or a straight or branched chain alkyl radical of up to 6 carbon atoms provided that one of $R^1$ and $R^2$ is other than hydrogen. Z may be

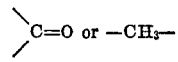

and X may be H, halogen, or an alkyl, alkoxy, haloalkyl or haloalkoxy radical of up to 6 carbon atoms. The halogen may be F, Cl, Br or I. The alkyl radical may be straight, or branched. Examples of alkyl radicals are, for example, methyl, ethyl, n-propyl, i-propyl, n-butyl, i-butyl, n-pentyl, 2-methyl-n-butyl, neopentyl, n-hexyl, 2-methyl-n-pentyl, 3-methyl-n-pentyl, 2,2-dimethyl-n-butyl, or 2,3-dimethyl-n-butyl. Examples of suitable alkoxy radicals are those corresponding to the foregoing alkyl radicals. Alkyl and alkoxy radicals substituted by one fluorine, chlorine, bromine or iodine are encompassed by the terms haloalkyl and haloalkoxy. $R^3$ may be hydrogen, a straight or branched chain alkyl or alkenyl radical of up to 6 carbon atoms which alkyl or alkenyl radical may be subtsituted by halogen, hydroxy, alkoxy, or dialkylamino wherein the alkyl or alkoxy radicals may contain up to 3 carbon atoms, phenyl, a nitrogen-, oxygen- or sulfur-substituted heterocyclic radical, e.g., pyridyl, furyl, thiazolyl, thienyl or pyrroyl, an alkylaryl radical, e.g., tolyl, xylyl, or arylalkyl, e.g., benzyl, phenethyl or cumyl.

The acenaphthenone of Formula II may be prepared according to several methods starting from (1) an $(X)_n$-substituted naphthalene-1-carboxylic acid; (2) an $(X)_n$-substituted naphthalene-1-acetic acid; (3) an $(X)_n$-substituted naphthalene-1-($\alpha$-alkyl)-acetic acid; or (4) an $(X)_n$-substituted acenaphthene. In the previous sentence, $n$ may be 0, 1, 2, or 3. The reaction sequences are illustrated below:

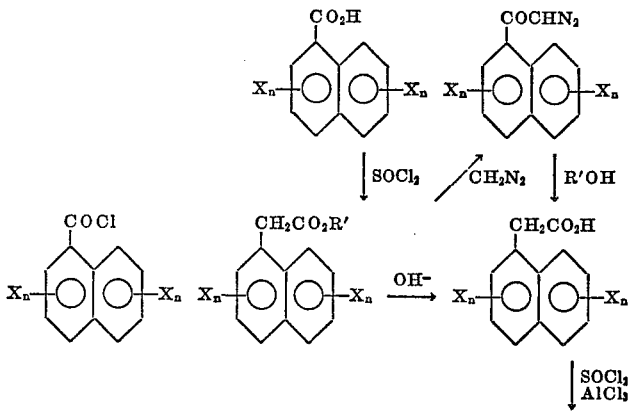

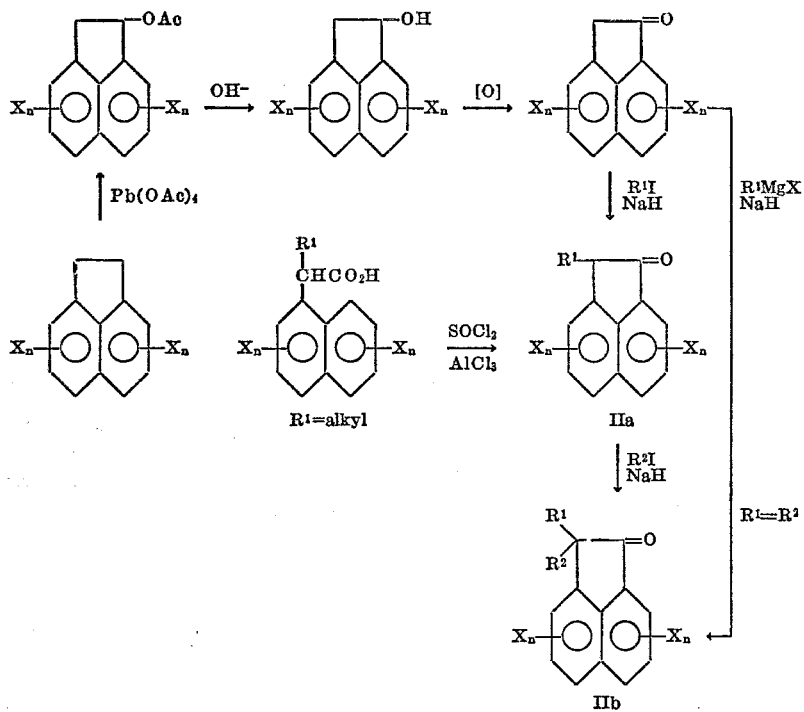

Examples of known substituted naphthalene-1-carboxylic acids which may be used as starting material for the synthesis of substituted acenaphthenones of Formula II correspond to the general formula

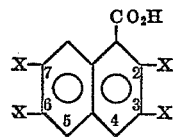

wherein the X-substituent in the 2-, 3-, 4-, 5-, 6-, or 7-position is that indicated below and is hydrogen if not otherwise indicated:

|  | 2 | 3 | 4 | 5 | 6 | 7 |
|---|---|---|---|---|---|---|
| I |  |  |  | Br |  |  |
| II |  |  |  |  | Br |  |
| III |  |  |  | F |  |  |
| IV |  | Cl |  |  |  |  |
| V |  |  |  | Cl |  |  |
| VI |  |  |  |  | Cl |  |
| VII |  |  |  |  |  | Cl |
| VIII |  |  | Cl |  |  | Cl |
| IX |  | Br |  |  |  |  |
| X |  |  | Br |  |  |  |
| XI |  |  |  |  |  | Br |
| XII |  |  | I |  |  |  |
| XIII |  |  |  |  |  | I |
| XIV |  | —CH$_2$Br |  |  |  |  |
| XV |  |  | NO$_2$ |  |  |  |
| XVI |  |  |  |  |  | Cl |
| XVII |  |  |  | I |  |  |
| XVIII |  |  |  | Cl | Cl |  |
| XIX |  |  | —NO$_2$ |  |  |  |
| XX |  |  |  | —NO$_2$ |  |  |
| XXI |  |  |  |  |  | —NO$_2$ |
| XXII |  | —OH |  |  |  |  |
| XXIII |  |  | —OH |  |  |  |
| XXIV |  |  |  | —OH |  |  |
| XXV |  |  |  |  | —OH |  |
| XXVI |  |  |  |  |  | —OH |
| XXVII |  |  |  |  |  | —OH |
| XXVIII |  | —OCH$_3$ |  |  |  |  |
| XXIX |  | —CH$_3$ |  |  |  |  |
| XXX |  |  |  | —CH$_3$ |  |  |
| XXXI |  |  |  |  | —CH$_3$ |  |
| XXXII |  |  |  |  |  | —CH$_3$ |
| XXXIII |  |  |  |  |  | —CH$_3$ |
| XXXIV |  |  |  | —C$_2$H$_5$ |  |  |
| XXXV |  |  |  |  |  | —C$_2$H$_5$ |
| XXXVI |  | —CH(CH$_3$)$_2$ |  |  |  |  |
| XXXVII |  |  |  |  |  | —CH(CH$_3$)$_2$ |
| XXXVIII |  | —CH$_3$ | —CH$_3$ |  |  |  |
| XXXIX |  | —CH$_3$ |  |  | —CH$_3$ |  |
| XL |  | —CH$_3$ |  |  |  | —CH$_3$ |
| L |  |  | —CH$_3$ | —CH$_3$ |  |  |
| LI |  |  | —CH$_3$ |  |  | —CH$_3$ |

Examples of known substituted acenaphthenes which may be used as starting material for the synthesis of the substituted acenaphthenones of Formula II correspond to the general formula below:

|         | 3      | 4    | 5    | 6    | 7    | 8    |
|---------|--------|------|------|------|------|------|
| LXXVIII | F      |      |      |      |      |      |
| LXXIX   |        |      | F    |      |      |      |
| LXXX    |        |      |      | F    |      |      |
| LXXXI   |        |      |      |      |      | F    |
| LXXXII  |        |      |      | Br   |      |      |
| LXXXIII |        |      |      |      | Br   |      |
| LXXXIV  | —C₂H₅  |      |      |      |      |      |
| LXXXV   | —CH(CH₃)₂ |   |      |      |      |      |
| LXXXVI  | —C(CH₃)₃ |    |      |      |      |      |
| LXXXVII |        |      |      |      |      | —C₂H₅ |
| LXXXVIII|        |      |      |      |      | —CH(CH₃)₂ |
| LXXXIX  |        |      |      |      |      | —C(CH₃)₃ |
| LXXXX   | —CH₃   |      |      | —CH₃ |      |      |
| LXXXXI  | —CH₃   |      |      |      | —CH₃ |      |
| LXXXXII | —CH₃   |      |      |      |      | —CH₃ |
| LXXXXIII|        | —CH₃ |      |      |      | —CH₃ |
| LXXXXIV |        |      | —CH₃ | —CH₃ |      |      |
| LXXXXV  |        |      | —CH₃ |      |      | —CH₃ |

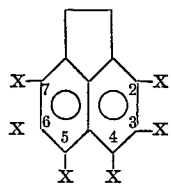

wherein the X-substituent in the 2-, 3-, 4-, 5-, 6- or 7- position is that indicated below and is hydrogen if not otherwise indicated:

The starting material for the final compounds of the present invention is an acenaphthenone of Formula II. The X-substituted acenaphthenones may be prepared, for example, by converting an X-substituted naphthalene carboxylic acid by known methods to the corresponding naphthalene acetic acid, and then converting the latter by known methods to the correspondingly substituted mono- or di-alkylated acenaphthenone. Treating an acenaphthenone of Formula II with a reducing agent yields the corresponding acenaphthenol of Formula III. Reacting the compound of Formula III with a nitrile in the presence of an acid yields an amide of Formula IV.

|         | 2 | 3           | 4    | 5         | 6        | 7    |
|---------|---|-------------|------|-----------|----------|------|
| LII     |   | F           |      |           |          |      |
| LIII    |   | Cl          |      | Cl        |          |      |
| LIV     |   | Cl          | Cl   |           |          |      |
| LV      |   |             |      | Cl        | Cl       |      |
| LVI     |   | Br          |      |           |          |      |
| LVII    |   |             |      | Br        |          |      |
| LVIII   |   |             |      | Br        | Br       |      |
| LIX     |   |             |      | Br        | Cl       |      |
| LX      |   |             |      | Cl        | F        |      |
| LXI     |   | —C₂H₅       |      |           |          |      |
| LXII    |   | —C₃H₇       |      |           |          |      |
| LXIII   |   | —CH(CH₃)₂   |      |           |          |      |
| LXIV    |   |             |      | —CH₃      |          |      |
| LXV     |   |             |      | —C₃H₇     |          |      |
| LXVI    |   |             |      | —CH₂CH(CH₃)₂ |       |      |
| LXVII   |   |             |      | —C(CH₃)₃  |          |      |
| LXVIII  |   |             |      | —CH₃      | —CH₃     |      |
| LXIX    |   |             |      | —C₃H₇     | —C₃H₇    |      |
| LXX     |   | —CH₃        |      |           | —CH₃     |      |
| LXXI    |   | —CH₃        |      |           |          | —CH₃ |
| LXXII   |   |             |      | —C(CH₃)₃  | —C(CH₃)₃ |      |
| LXXIII  |   | —C₂H₅       |      | Cl        |          |      |
| LXXIV   |   | —C₂H₅       |      | Br        |          |      |
| LXXV    |   |             |      | —CH₂Br    |          |      |
| LXXVI   |   |             |      | —CH₂Br    | —CH₂Br   |      |
| LXXVII  |   |             |      | —OCH₃     |          |      |

Examples of known substituted acenaphthenones which may be used as starting material for the final compounds of the present invention include compounds of the general formula below:

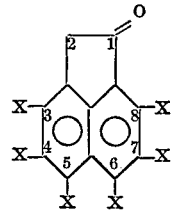

wherein the X-substituent in the 3-, 4-, 5-, 6-, 7-, or 8-position is that indicated below and is hydrogen if not otherwise indicated:

Reduction of the amide yields the corresponding amine of Formula V.

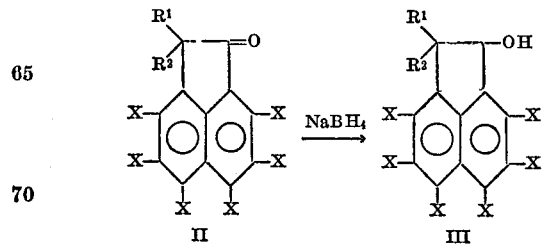

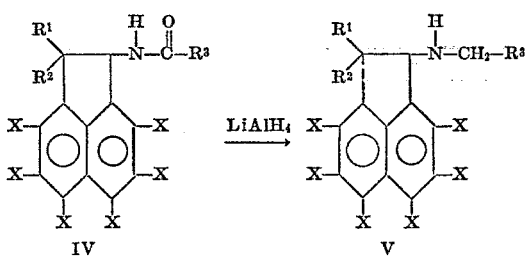

IV    V

Reduction of the starting material II may be carried out by any convenient reducing means, for example, by $NaBH_4$, $KBH_4$, $LiAlH_4$, and catalytic hydrogenation. Likewise, reduction of the amide IV may be carried out, for example, by $LiAlH_4$. The conversion of the acenaphthenol of Formula III to the amide of Formula IV is carried out by reaction with a nitrile in the presence of acid. In this reaction the nitrile may have the general formula $R^3CN$ wherein $R^3$ may be hydrogen, alkyl, aryl, alkylaryl, or arylalkyl. The alkyl radical may contain up to 6 carbon atoms and may be straight chained, branched, substituted, unsubstituted, saturated or unsaturated. The substituents may be, for example, halogen, hydroxyl, alkoxy, amino, or mono- or a disubstituted amine. The aryl radical may be a monocyclic radical as illustrated by, for example, phenyl, pyridine, furan, thiazole, thiophene, pyrrole, etc. The aryl radical may be substituted by such groups as, for example, alkyl of up to 6 carbons, or halogen or nitro. The disubstituted amine substituent of the alkyl radical may also form a 5 to 7 membered heterocycle which may have up to two hetero atoms, such as, for example morpholino, pyrrolidino, piperidino, etc. Some specific examples of nitriles which are useful in the present invention are the following:

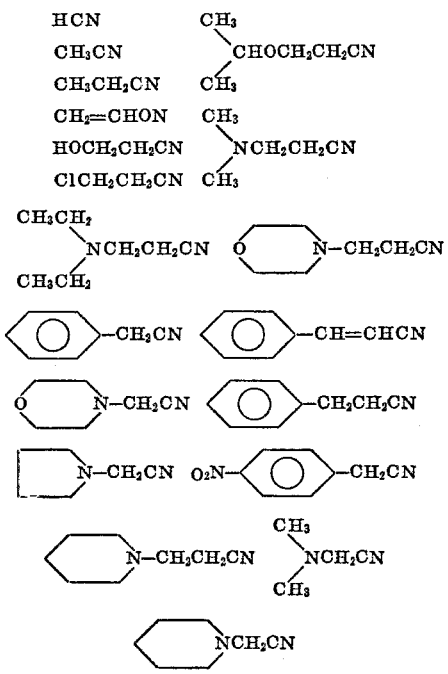

The reaction between the nitrile and the acenaphthenol conveniently takes place at about room temperature and at about atmospheric pressure. Operable temperatures, however, may vary from about −20° C. to about 80° C., preferably from about 0° C. to about 60° C. and most preferably from about 25° C. to about 50° C. Operable pressures may vary from about 0.2 atmosphere to about 5 atmospheres, preferably from about 0.5 atmospheres to about 2 atmospheres, and most preferably at about atmospheric pressure. The reaction time may vary from a few minutes to several days. Generally, reaction times will be from about 10 minutes to about 100 hours. Lower temperatures usually require longer reaction time.

While an excess of the nitrile is permissible, the nitrile and acenaphthenol may also be employed in stoichiometric quantities, or with a slight excess of nitrile.

In the case of nitriles which are solid at room temperature, the reaction is preferably carried out in the presence of polar and non-polar solvents such as, for example, glacial acetic acid, acetic anhydride, di-n-butyl ether, chloroform, carbon tetrachloride, hexane and nitrobenzene.

A variety of acids may be used to carry out the reaction between the acenaphthenol and the nitrile. Examples of suitable acids are sulfuric, perchloric, phosphoric, polyphosphoric, formic, substituted sulfonic acids and boron trifluoride. In general, concentrated sulfuric acid is preferred.

The compounds of this invention are useful as anti-inflammatory agents and are effective in the prevention and inhibition of granuloma tissue formation in warm blooded animals, for example, in a manner similar to indomethacin. They may be used to decrease joint swelling tenderness, pain and stiffness, in mammalian species, e.g., in conditions such as rheumatoid arthritis. A compound of Formula I or a physiologically acceptable salt (when applicable) of the character described above may be compounded according to accepted pharmaceutical practice in oral dosage forms such as tablets, capsules, elixirs or powders for administration of about 100 mg. to 2 gm. per day, preferably 100 mg. to 1 gm. per day in two to four divided doses. For example, about 150 mg./kg./day is effective in reducing paw swelling in rats.

The intermediate acenaphthenols of Formula III absorb ultraviolet light and are useful sun-screening agents for the prevention of sunburn. For this purpose they may be used in similar manner to known sun-screening agents, e.g., p-aminobenzoic acid.

The following examples illustrate the present invention without, however, limiting the same thereto. All temperatures are expressed in degrees centigrade.

EXAMPLE 1

(A) 2,2-dimethyl-1-acenaphthenol

A solution of 2.5 g. of 2,2-dimethyl-1-acenaphthenone in 20 ml. of methanol is treated with 750 mg. of sodium borohydride and stirred at room temperature for 1.5 hours. The solution is treated with acetic acid, concentrated and diluted with water. The aqueous phase is extracted with chloroform, and the chloroform extracts are washed with 8% salt solution, dried ($Na_2SO_4$) and evaporated. The residue is crystallized from ether-hexane to give 1.38 g. of the title compound (M.P. 89–90°). The analytical sample is prepared by crystallization from ether-hexane: M.P. 89–90°, $\lambda^{KBr}$ 3.2μ; $\tau^{CDCl_3}_{TMS}$ 8.63, 8.55 (S, 2—$CH_3$), 8.18 (S, 1—OH) and 4.80 (S, 1—H)

Analysis.—Calcd. for $C_{14}H_{14}O$ (percent): C, 84.81; H, 7.12. Found (percent): C, 85.02; H, 7.15.

(B) 2-methyl-1-acenaphthenol

Following the procedure as above but substituting 2-methyl-1-acenaphthenone for 2,2-dimethyl-1-acenaphthenone, a mixture of the cis-trans isomers of the title compound is obtained.

EXAMPLE 2

1-acetamido-2,2,-dimethylacenaphthene

A solution of 1.0 g. of 2,2-dimethyl-1-acenaphthenol in 10 ml. of acetonitrile is stirred and treated dropwise with 3 ml. of concentrated sulfuric acid. The temperature rises to 45° and the stirring is continued for 70 minutes. The reaction mixture is poured into ice-water and chloroform is added. The organic layer is separated, and washed with saturated sodium bicarbonate solution, 8% salt solution, dried ($Na_2SO_4$) and evaporated. The residue is dissolved in 10 ml. of benzene and added to a dry-packed neutral alumina column (30 g.). The column in eluted with benzene, benzene-chloroform mixtures, and chloroform. The amide fractions are pooled and evaporated. The residue is crystallized from ether-hexane to give 650 mg. of the title compound (M.P. 130–131°). The analytical sample is prepared by crystallization from isopropyl ether: M.P. 130–131°;

$\lambda^{KBr}$ 3.07, 6.10$\mu$; $\tau_{TMS}^{CDCl_3}$ 8.72, 8.43 (S, 2—$CH_3$) and 7.93 (S, 2—$CH_3CONH$)

*Analysis.*—Calcd. for $C_{16}H_{17}NO$ (percent): C, 80.30; H, 7.16; N, 5.85. Found (percent): C, 80.27; H, 7.29; N, 5.79.

EXAMPLE 3

1-benzamido-2,2-dimethylacenaphthene

A solution of 1.0 g. of 2,2-dimethyl-1-acenaphthenol in 10 ml. of benzonitrile is stirred and treated dropwise with 2 ml. of concentrated sulfuric acid. The temperature rises to 50° and the stirring is continued for 10 minutes. The reaction mixture is poured into ice water and chloroform is added. The organic layer is separated, washed with saturated sodium bicarbonate solution, 8% salt solution, dried ($Na_2SO_4$) and evaporated. The residue is dissolved in benzene and added to a dry-packed neutral alumina column (100 g.). The column is eluted with benzene and then chloroform. The amide fractions are pooled and evaporated. The residue is crystallized from chloroform-ether to give 847 mg. of the title compound (M.P. 159.5–160.5°). The analytical sample is prepared by crystallization from chloroform-isopropyl ether: M.P. 160–161°;

$\lambda^{KBr}$ 3.08, 6.18$\mu$; $\tau_{TMS}^{CDCl_3}$ 8.63, 8.34 (S, 2—$CH_3$)

*Analysis.*—Calcd. for $C_{21}H_{19}NO$ (percent): C, 83.69; H, 6.35; N, 4.65. Found (percent): C, 83.46; H, 6.47; N, 4.68.

EXAMPLE 4

1-β-isopropoxypropionamido-2,2-dimethylacenaphthene

Following the procedure in the above example but substituting β-isopropoxypropionitrile for benzonitrile there is obtained 850 mg. of the title compound (M.P. 103–104°). The analytical sample is prepared by crystallization from chloroform-ether: M.P. 103–104°, $\lambda^{KBr}$ 3.08$\mu$, 6.12$\mu$; $\tau_{TMS}^{CDCl_3}$ 8.73, 8.41 (S, 2—$CH_3$)

*Analysis.*—Calcd. for $C_{21}H_{19}NO$ (percent): C, 77.13; H, 8.09; N, 4.50. Found (percent): C, 77.04; H, 8.30; N, 4.48.

EXAMPLE 5

1-β-hydroxypropionamido-2,2-dimethylacenaphthene

A solution of 500 mg. of 2,2-dimethyl-1-acenaphthenol in 5 ml. of hydracrylonitrile is stirred and treated dropwise with 1.5 ml. of concentrated sulfuric acid. The temperature rises to 55° and the mixture is stirred at room temperature for 20 minutes. The reaction mixture is poured into water and treated with chloroform. The organic layer is separated and washed with 8% salt solution, dried ($Na_2SO_4$) and evaporated. The residue is crystallized from chloroform-isopropyl ether to give 437 mg. of the title compound (M.P. 147.5–149.5°). The analytical sample is prepared by crystallization from ethyl acetate: M.P. 152–153°;

$\lambda^{KBr}$ 2.98, 3.06, 6.06$\mu$; $\tau_{TMS}^{CDCl_3}$ 8.74, 8.45 (S, 2—$CH_3$)

*Analysis.*—Calcd. for $C_{17}H_{19}NO_2$ (percent): C, 75.81; H, 7.11, N, 5.20. Found (percent): C, 75.95; H, 7.12; N, 5.26.

EXAMPLE 6

1-β-chloropropionamido-2,2-dimethylacenaphthene

A solution of 500 mg. of 2,2-dimethyl-1-acenaphthenol in 5 ml. of 3-chloorpropionitrile is stirred and treated dropwise with 1.5 ml. of concentrated sulfuric acid. The temperature rises to 36° and the stirring is continued for 30 minutes. The reaction mixture is poured into water and extracted with chloroform. The chloroform extracts are washed with 8% salt solution, dried ($Na_2SO_4$) and evaporated. The residue is plate chromatographed on silica gel using chloroform as the developing solvent. Elution of the major UV band with ethyl acetate, evaporation and crystallization of the residue from chloroform-hexane gives 430 mg. of the title compound (M.P. 143–144°). The analytical sample is prepared by crystallization from chloroform-hexane: M.P. 143–143.5°;

$\lambda^{KBr}$ 3.08$\mu$, 612$\mu$; $\tau_{TMS}^{CDCl_3}$ 8.72, 8.43 (S, 2—$CH_3$)

*Analysis.*—Calcd. for $C_{19}H_{18}ClNO$ (percent): C, 70.95; H, 6.31; N, 4.87; Cl, 12.32. Found (percent): C, 70.98; H, 6.53; N, 4.75; Cl, 12.67.

EXAMPLE 7

1-acrylamido-2,2-dimethylacenaphthene

A solution of 1.0 g. of 2,2-dimethyl-1-acenaphthenol in 10 ml. of acrylonitrile is stirred and treated dropwise with 3 ml. of concentrated sulfuric acid. The mixture is allowed to stir for 30 minutes and then poured into water and extracted with chloroform. The chloroform extracts are washed with staurated sodium bicarbonate solution, 8% salt solution, dried ($Na_2SO_4$) and evaporated. The residue is dissolved in benzene and added to a dry-packed neutral alumina column (30 g.). The column is eluted with benzene, benzenechloroform mixtures and chloroform. The amide fractions are pooled and evaporated. The residue is crystallized from ether-hexane to give 585 mg. of the title compound (M.P. 131.5–132.5°). The analytical sample is prepared by crystallization from ether-hexane: M.P. 133–134°;

$\lambda^{KBr}$ 3.06, 6.06$\mu$; $\tau_{TMS}^{CDCl_3}$ 8.72, 8.41 (S, 2—$CH_3$)

*Analysis.*—Calcd. for $C_{17}H_{17}NO$ (percent): C, 81.24; H, 6.82; N, 5.57. Found (percent): C, 81.03; H, 6.74; N, 5.46.

EXAMPLE 8

1-allylamido-2,2-dimethylacenaphthene

A solution of 1.25 g. of 2,2-dimethyl-1-acenaphthenol in 12.5 ml. of 3-butenenitrile is stirred and treated dropwise with 2.5 ml. of concentrated sulfuric acid. The temperature rises to 49° and the solution is stirred for 30 minutes. The mixture is poured into water and extracted with ether. The ether extracts are washed with 8% salt solution, dried and evaporated. The residue is plate chromatographed on neutral alumina using chloroform-hexane (1:1) as the developing solvent. The major UV band is eluted with ethyl acetate and crystallized from ether-pet. ether to give 1.01 g. of the title compound (M.P. 71–73°). The analytical sample is prepared by crystallization from ether-pet. ether: M.P. 73.5–74.5°;

$\lambda^{KBr}$ 3.04, 6.09$\mu$; $\tau_{TMS}^{CDCl_3}$ 8.75, 8.43 (S, 2—$CH_3$)

*Analysis.*—Calcd. for $C_{18}H_{19}NO$ (percent): C, 81.47; H, 7.22; N, 5.28. Found (percent): C, 81.59; H, 7.39; N, 5.14.

EXAMPLE 9

1-β-dimethylaminopropionamido-2,2-dimethylacenaphthene

A solution of 2.0 g. of 2,2-dimethyl-1-acenaphthenol in 0.98 g. of 3-dimethylaminopropionitrile and 30 ml. of acetic acid is treated with 3 ml. of concentrated sulfuric acid and stirred at room temperature for four days. The mixture is poured ino water, made alkaline and the precipitate collected by filtration. The solid is dissolved in chloroform, and the chloroform solution washed with water, 8% salt soltuion, dried (Na$_2$SO$_4$) and evaporated. The residue is plate chromatographed on silica gel using ethyl acetate as the developing solvent. Elution of the major UV band with ethyl acetate-methanol (7:3), and evaporation gives 1.44 g. of the title compound as an oil. The analytical sample is prepared by vacuum distillation:

$\lambda^{neat}$ 3.03, 6.10$\mu$ $\tau_{TMS}^{CDCl_3}$ 8.77, 8.40 (S, 2—CH$_3$)

*Analysis.*—Calcd. for C$_{19}$H$_{24}$N$_2$O (percent): C, 76.99; H, 8.16; N, 9.45. Found (percent): C, 77.11; H, 8.28; N, 9.32.

EXAMPLE 10

1-$\beta$-diethylaminopropionamido-2,2-dimethylacenaphthene

Following the procedure in the above example but substituting 0.634 g. of 3-diethylaminopropionitrile for the 3-dimethylaminopropionitrile and using 1 g. of 2,2-dimethyl-1-acenaphthenol there is obtained 1.2 g. of the title compound as an oil. The analytical sample is prepared by vacuum distillation:

$\lambda^{neat}$ 3.03, 6.10$\mu$; $\tau_{TMS}^{CDCl_3}$ 8.75, 8.42 (S, 2—CH$_3$)

*Analysis.*—Calcd. for C$_{21}$H$_{28}$N$_2$O (percent): C, 77.73; H, 8.70; N, 8.63. Found (percent): C, 77.71; H, 8.62; N, 8.42.

EXAMPLE 11

1-ethylamino-2,2-dimethylacenaphthene hydrochloride

A solution of 2.55 g. of 1-acetamido-2,2-dimethylacenaphthene in 50 ml. of tetrahydrofuran is treated with 1.5 g. of lithium aluminum hydride and refluxed overnight. The excess hydride is decomposed with ethyl acetate and water and then the mixture is extracted with ethyl acetate. The ethyl acetate fractions are extracted with 2 N hydrochloric acid. The acid soluion is made alkaline and extracted with chloroform. The chloroform extracts are washed with 8% salt solution, dried (Na$_2$SO$_4$) and evaporated. The residue is dissolved in ether and treated with dry hydrogen chloride. The precipitate is collected by filtration to give 1.41 g. of the title compound (M.P. 234.5–236°). The analytical sample is prepared by crystallization from ethanol-ether: M.P. 236.5–237.5°.

*Analysis.*—Calcd. for C$_{16}$H$_{20}$ClN (percent): C, 73.40; H, 7.70; N, 5.35; Cl, 13.54. Found (percent): C, 73.54; H, 7.82; N, 5.38; Cl, 13.54.

EXAMPLE 12

1-(3-isopropoxypropylamino)-2,2-dimethyl-acenaphthene

Following the procedure in the above example but substituting 2.13 g. of 1 - $\beta$-isopropoxypropionamido-2,2-dimethylacenaphthene for the 1-acetamido-2,2-dimethylacenaphthene there is obtained 1.7 g. of the title compound as an oil. The analytical sample is prepared by vacuum distillation:

$\lambda^{neat}$ 2.96$\mu$; $\tau_{TMS}^{CDCl_3}$ 8.64, 8.48 (S, 2—CH$_3$)

*Analysis.*—Calcd. for C$_{20}$H$_{27}$NO (percent): C, 80.76; H, 9.15; N, 4.71. Found (percent): C, 80.75; H, 8.67; N, 4.63.

EXAMPLE 13

3[(2,2-dimethylacenaphthen-1-yl)-amino]-1-propanol

Following the procedure in the above example but substituting 243 mg. of 1-$\beta$-hydroxypropionamido - 2,2-dimethylacenaphthene for the 1 - $\beta$ - isopropoxypropionamido - 2,2 - dimethylacenaphthene there is obtained 122 mg. of the title compound (M.P. 59–61°). The analytical sample is prepared by recrystallization from isopropyl ether: M.P. 63–64°;

$\lambda^{KBr}$ 2.96, 3.18$\mu$; $\tau_{TMS}^{CDCl_3}$ 8.66, 8.48 (S, 2—CH$_3$)

*Analysis.*—Calcd. for C$_{17}$H$_{21}$NO (percent): C, 79.96; H, 8.29; N, 5.49. Found (percent): C, 80.19; H, 8.52; N, 5.27.

EXAMPLE 14

2,2-dimethyl-3-fluoro-1-acenaphthenol

To a solution of 2.5 g. of 3-fluoroacenaphthenone in 50 ml. of benzene there is added 6 g. of methyl iodide and 2.5 g. of sodium hydride dispersion (49%). After work-up and removal of the benzene, the title product is crystallized from ethyl alcohol.

EXAMPLES 15–31

Following the procedure of Example 14 but employing as starting material the X-substituted acenaphthenone having the following general formula

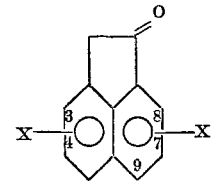

wherein the substituent in the 3-, 4-, 5-, 6-, 7- or 8-position is that indicated in the following table, and is hydrogen if not otherwise indicated, the correspondingly substituted 2,2-dimethyl-1-acenaphthenol is obtained.

| Example | 3 | 4 | 5 | 6 | 7 | 8 |
|---|---|---|---|---|---|---|
| 15 | | | | —CH$_3$ | | —CH$_3$ |
| 16 | | —CH$_3$ | | | | —CH$_3$ |
| 17 | | | | —CH$_3$ | —CH$_3$ | |
| 18 | —CH$_3$ | | | | —CH$_3$ | |
| 19 | —CH$_3$ | | | | | —CH$_3$ |
| 20 | —CH$_3$ | | | | —CH$_3$ | |
| 21 | | | | | | —CH(CH$_3$)$_2$ |
| 22 | | | | | | —C(CH$_3$)$_3$ |
| 23 | | | Br | | | |
| 24 | | | | F | | |
| 25 | | | | Br | | |
| 26 | | | | | | F |
| 27 | | | | | | —C$_2$H$_5$ |
| 28 | | —C$_2$H$_5$ | | | | |
| 29 | | —C(CH$_3$)$_3$ | | | | |
| 30 | | —CH(CH$_3$)$_2$ | | | | |
| 31 | | | | | F | |

EXAMPLES 32–49

Following the procedure of Example 2 but substituting the X-substituted acenaphthenol of Examples 14–31, there is obtained, respectively, the corresponding X-substituted 1-acetamido-2,2-dimethylacenaphthene.

EXAMPLES 50–63

Following the procedure of Example 14 but substituting an equivalent amount of the following alkyl iodide for methyl iodide, there is obtained, respectively, the corresponding 2,2-dialkyl - 3 - fluoro - 1 - acenaphthenol wherein the alkyl radical is derived from the alkyl iodide.

Example:
50 .................... Ethyl iodide.
51 .................... n-Propyl iodide.
52 .................... i-Propyl iodide.
53 .................... n-Butyl iodide.
54 .................... Sec-butyl iodide.
55 .................... Isobutyl iodide.
56 .................... t-Butyl iodide.
57 .................... n-Pentyl iodide.
58 .................... 4-iodo-2-methylbutane.
59 .................... 2-iodopentane.
60 .................... 2-iodo-2-methylbutane.
61 .................... 1-iodo-2-methylbutane.
62 .................... n-Hexyl iodide.
63 .................... 2-iodo - 2,3 - dimethylbutane.

EXAMPLE 64

2-ethyl-1-acenaphthenone

A solution of 1-naphthaleneacetic acid (400 g., 2.15 moles) in 950 ml. of 98% ethanol containing 100 ml. of concentrated sulfuric acid is refluxed for two hours. The cooled mixture is poured into 1 liter of water and extracted twice with ether. The ether layer is washed repeatedly with 5% aqueous sodium bicarbonate until starting material no longer is recovered upon acidification of the bicarbonate extracts. The ether solution is dried (MgSO$_4$) and distilled to yield ethyl 1-naphthaleneacetate.

In a flame-dried, 3-neck flask, fitted with a magnetic stirrer, condenser, and a thermometer to measure the solution temperature, are placed 130 g. (0.61 mole) of the above ester, 800 ml. of dry benzene and 156 g. (1 mole) of ethyl iodide. An Erlenmeyer flask containing 46 g. (1 mole) of a 56% sodium hydride dispersion in paraffin oil is attached to one neck of the reaction vessel by means of a short piece of large diameter Tygon Tubing. The hydride is added to the reaction vessel in small portions during a period of 1.5 hours while the temperature is maintained at 20–25° by external cooling. After the addition is complete, stirring is continued for 1.5 hours at room temperature, then for 18 hours with the solution under reflux. The cooled mixture is carefully decomposed by the slow addition of 200 ml. of glacial acetic acid followed by 500 ml. of water. The mixture is extracted twice with ether and the extracts washed with water and then 5% aqueous sodium bicarbonate until free of acetic acid. The dried (MgSO$_4$) solution is then distilled, affording ethyl α-(1-naphthyl)butyrate.

A mixture of the above ester (430 g., 1.89 moles) and 100 g. (2.5 moles) of sodium hydroxide in 750 ml. of water is refluxed for 4 hours. The resulting colorless solution is cooled and extracted with ether to remove unreacted ester, and the aqueous layer acidified with hydrochloric acid. The colorless solid, collected by suction filtration is crystallized from aqueous ethyl alcohol giving α-(1-naphthyl)-butyric acid.

The solution of α-(1-naphthyl)butyric acid (163 g.) and thionyl chloride (150 g.) in 450 ml. of benzene is refluxed for 3 hours. The solvent and excess thionyl chloride is removed and the crude α-(1-naphthyl)butyryl chloride is added dropwise over a period of 2 hours to a well-stirred mixture of 325 g. (2.4 moles) of granular aluminum chloride in 1 liter of carbon disulfide kept at room temperature. The mixture which turns dark green and then black is stirred overnight, then decomposed carefully with ice and water. The dark, sticky organic fraction is subjected to steam distillation. A yellow oil comes over very slowly. An ether extract of this oil is dried (MgSO$_4$) and distilled, affording 2-ethyl-1-acenaphthenone as a colorless oil. When chilled, the oil solidifies. Crystallization once from ethyl alcohol and twice from benzene-Skellysolve B (1:4), gives solid 2-ethyl-1-acenaphthenone.

EXAMPLES 65–95

Following the procedure of Example 64 but employing, respectively, as starting material an X-substituted naphthalene-1-acetic acid prepared by Arndt-Eistert homologation of an X-substituted naphthalene-1-carboxylic acid of the following formula

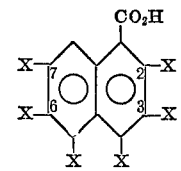

wherein the X-substituent in the 2-, 3-, 4-, 5-, 6- or 7-position is that indicated below and is hydrogen if not otherwise indicated, the corresponding X-substituted 2-methyl-1-acenaphthenone is obtained.

| Example | 2 | 3 | 4 | 5 | 6 | 7 |
|---|---|---|---|---|---|---|
| 65 | | | | Br | | |
| 66 | | | | | Br | |
| 67 | | | | F | | |
| 68 | Cl | | | | | |
| 69 | | | | | Cl | |
| 70 | | | | | | Cl |
| 71 | | | | | | Cl |
| 72 | | | Cl | | Cl | |
| 73 | | Br | | | | |
| 74 | | | | Br | | |
| 75 | | | | | | Br |
| 76 | | | | I | | |
| 77 | | | | | | I |
| 78 | —CH$_2$Br | | | | | |
| 79 | | | | I | | |
| 80 | | | | Cl | Cl | |
| 81 | —OCH$_3$ | | | | | |
| 82 | —CH$_3$ | | | | | |
| 83 | | | | —CH$_3$ | | |
| 84 | | | | | CH$_3$ | |
| 85 | | | | | | —CH$_3$ |
| 86 | | | | | | —CH$_3$ |
| 87 | | | | —C$_2$H$_5$ | | |
| 88 | | | | | | —C$_2$H$_5$ |
| 89 | CH(CH$_3$)$_2$ | | | | | |
| 90 | | | | | | —CH(CH$_3$)$_2$ |
| 91 | —CH$_3$ | —CH$_3$ | | | | |
| 92 | | —CH$_3$ | | | —CH$_3$ | |
| 93 | | —CH$_3$ | | | | |
| 94 | | —CH$_3$ | —CH$_3$ | | | —CH$_3$ |
| 95 | | —CH$_3$ | —CH$_3$ | | | —CH$_3$ |

EXAMPLES 96–127

Following the procedure of Example 1 but substituting, respectively, the X-substituted acenaphthenone of Examples 64–95, there is obtained, respectively, the corresponding X-substituted 2-methyl-1-acenaphthenol.

EXAMPLES 128–159

Following the procedure of Example 2 but substituting, respectively, the X-substituted acenaphthenol of Examples 96–127, there is obtained, respectively, the corresponding X-substituted 1-acetamido-2-methylacenaphthene.

EXAMPLES 159–190

Following the procedure of Example 3 but substituting, respectively, the X-substituted acenaphthenol of Examples 96–127, there is obtained, respectively, the corresponding X-substituted 1-benzamido-2-methylacenaphthene.

EXAMPLES 191–208

Following the procedure of Example 11 but substituting, respectively, the X-substituted 1-acetamido-2,2-dimethylacenaphthene of Examples 32–49, there is obtained, respectively, the corresponding X-substituted 1-ethylamino-2,2-dimethylacenaphthene hydrochloride.

EXAMPLES 209–240

Following the procedure of Example 12 but substituting, respectively, the X-substituted 1-acetamido-2-methylacenaphthene of Examples 128–159, there is obtained, respectively, the corresponding X-substituted 1-(3-isopropoxypropylamino)-2-methylacenaphthene.

What is claimed is:
1. A compound having the structural formula

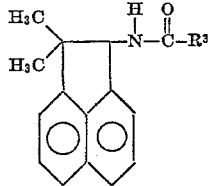

wherein $R^3$ is methyl, phenyl, isopropoxyethyl, β-hydroxyethyl, β-chloroethyl, vinyl, allyl, β-dimethylaminoethyl, or β-diethylaminoethyl.

2. A compound according to claim 1 having the name 1-acetamido-2,2-dimethylacenaphthene.
3. A compound according to claim 1 having the name 1-benzamido-2,2-dimethylacenaphthene.
4. A compound according to claim 1 having the name 1-β-isopropoxypropionamido-2,2-dimethylacenaphthene.
5. A compound according to claim 1 having the name 1-β-hydroxypropionamido-2,2-dimethylacenaphthene.
6. A compound according to claim 1 having the name 1-β-chloropropionamido-2,2-dimethylacenaphthene.
7. A compound according to claim 1 having the name 1-acrylamido-2,2-dimethylacenaphthene.
8. A compound according to claim 1 having the name 1-allylamido-2,2-dimethylacenaphthene.
9. A compound according to claim 1 having the name 1 - β - dimethylaminopropionamido - 2,2 - dimethylacenaphthene.
10. A compound according to claim 1 having the name 1 - β - diethylaminopropionamido - 2,2 - dimethylacenaphthene.

References Cited

Lette et al.: Hopper-Seyler's J. Physiol. Chem., vol. 288, pp. 25–30 (1951).

HARRY I. MOATZ, Primary Examiner

U.S. Cl. X.R.

260—247.2 A, 247.5 R, 293.62, 295 AM, 296 B, 302 R, 306.8 R, 313.1, 326.3, 327 R, 332.2 C, 347.3, 347.7, 515 R 515 A, 590, 562 A, 562.1; 424—60, 248, 263, 267, 270, 274, 275, 285, 324, 330

UNITED STATES PATENT OFFICE
CERTIFICATE OF CORRECTION

Patent No. 3,755,442  Dated August 28, 1973

Inventor(s) Seymour D. Levine

It is certified that error appears in the above-identified patent and that said Letters Patent are hereby corrected as shown below:

Column 2, in formula I, "$\overset{H}{\underset{|}{-N-Z-R^2}}$" should read -- $\overset{H}{\underset{|}{-N-Z-R^3}}$ --.

Column 2, line 17, "$-CH_3-$" should read -- $-CH_2-$ --.

Column 2, the formula at the bottom of the page should read

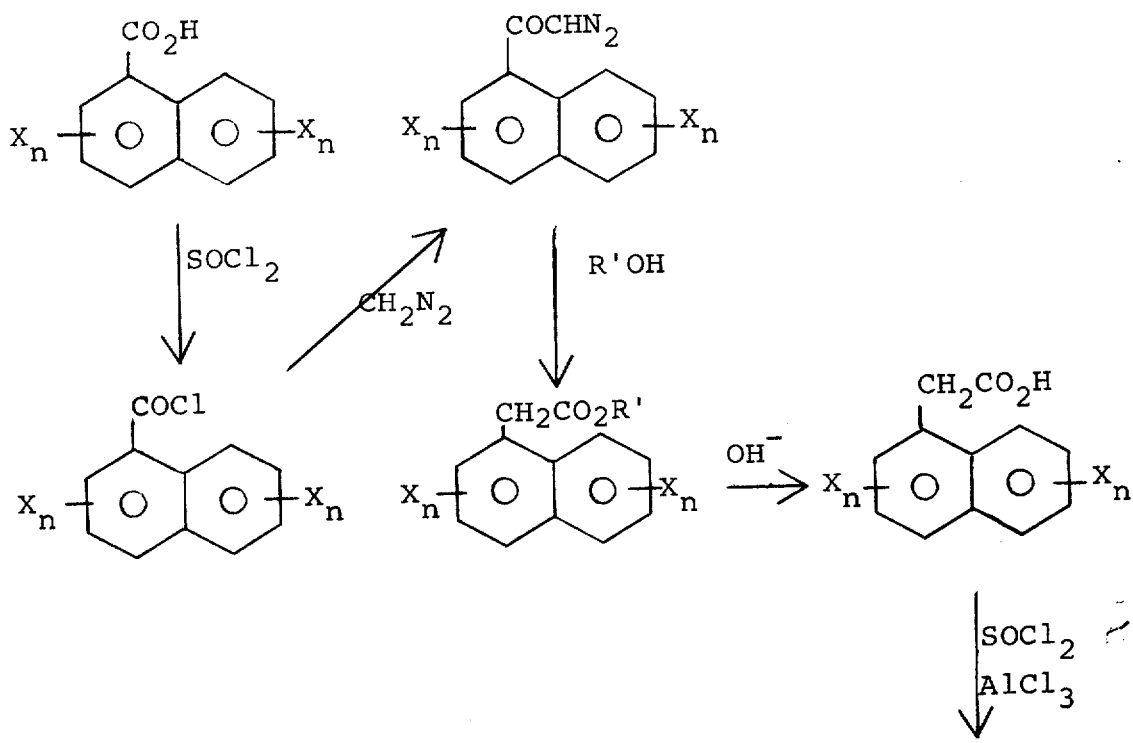

Column 3, line 37, the formula should read

UNITED STATES PATENT OFFICE
CERTIFICATE OF CORRECTION

Patent No. 3,755,442                    Dated August 28, 1973

Inventor(s) Seymour D. Levine

It is certified that error appears in the above-identified patent and that said Letters Patent are hereby corrected as shown below:

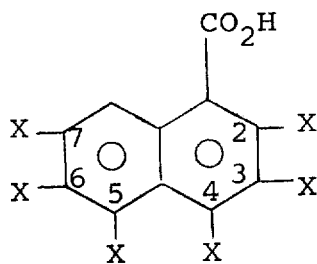

Column 6, LXXXV in the table, "-QH(CH$_3$)$_2$" should read -- -CH(CH$_3$)$_2$ --.

Column 7, line 42, "CH$_2$=CHON" should read --CH$_2$=CHCN--.

Column 9, line 14, "(S,2-CH$_3$CONH)" should read --(S,1-CH$_3$CONH)--.

Column 10, line 31, "staurated" should read --saturated--.

Column 12, in the formula

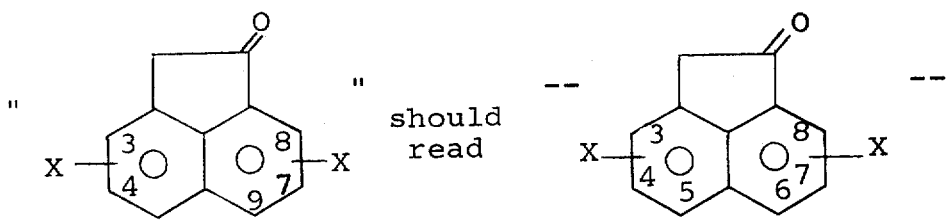

Column 14, line 20, after "chloride" insert --(BDH)--.

Column 14, the formula should read

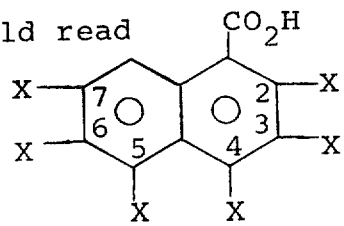

UNITED STATES PATENT OFFICE
CERTIFICATE OF CORRECTION

Patent No. 3,755,442          Dated August 28, 1973

Inventor(s) Seymour D. Levine

It is certified that error appears in the above-identified patent and that said Letters Patent are hereby corrected as shown below:

Column 14, example 84, "$CH_3$" should read -- $-CH_3$ --.

Signed and sealed this 1st day of January 1974.

(SEAL)
Attest:

EDWARD M. FLETCHER, JR.　　　　　RENE D. TEGTMEYER
Attesting Officer　　　　　　　　　Acting Commissioner of Patents